United States Patent
Larsen et al.

(10) Patent No.: US 9,702,137 B2
(45) Date of Patent: Jul. 11, 2017

(54) NODE STRUCTURES FOR LATTICE FRAMES

(71) Applicant: Vestas Wind Systems A/S, Aarhus N. (DK)

(72) Inventors: Gerner Larsen, Hinnerup (DK); Niels Christian Olsen, Tjele (DK)

(73) Assignee: MHI Vestas Offshore Wind A/S, Aarhus N (DK)

( * ) Notice: Subject to any disclaimer, the term of this patent is extended or adjusted under 35 U.S.C. 154(b) by 0 days.

(21) Appl. No.: 14/406,984

(22) PCT Filed: Jun. 7, 2013

(86) PCT No.: PCT/DK2013/050178
§ 371 (c)(1),
(2) Date: Dec. 10, 2014

(87) PCT Pub. No.: WO2013/185769
PCT Pub. Date: Dec. 19, 2013

(65) Prior Publication Data
US 2015/0107181 A1    Apr. 23, 2015

Related U.S. Application Data

(60) Provisional application No. 61/657,847, filed on Jun. 10, 2012.

(30) Foreign Application Priority Data

Feb. 7, 2012  (DK) .................................. 2012 70388

(51) Int. Cl.
*E04H 12/00* (2006.01)
*E04B 1/19* (2006.01)
(Continued)

(52) U.S. Cl.
CPC ............ *E04B 1/1903* (2013.01); *B21D 47/00* (2013.01); *E02B 17/0004* (2013.01);
(Continued)

(58) Field of Classification Search
CPC ........ E04B 1/1903; E04B 1/585; F03D 11/04; F04H 12/10; B21D 47/00; F05B 2240/9121
(Continued)

(56) References Cited

U.S. PATENT DOCUMENTS 2,189,201 A * 2/1940 Flader ........................... 403/178
2,658,776 A * 11/1953 Wilcox ..................... E04G 7/22
285/125.1

(Continued)

FOREIGN PATENT DOCUMENTS

DE          925325 C      3/1955

OTHER PUBLICATIONS

International Searching Authority, International Serach Report and Written Opinion issued in corresponding International Application No. PCT/DK2013/050178, dated Sep. 18, 2013, 8 pages.

(Continued)

*Primary Examiner* — Patrick J Maestri
(74) *Attorney, Agent, or Firm* — Wood Herron & Evans LLP

(57) ABSTRACT

A node structure for connecting a member of a lattice frame to one or more other members of the frame comprises a hollow brace having opposed walls that converge outwardly at an acute angle in cross-section toward a central plane to connect at an outer edge. At least one root portion has a central longitudinal axis extending outwardly in the central plane of the brace for alignment with a member of the frame. The root portion has an inner end cut away at opposite sides around the central plane to leave a joining surface that (Continued)

intersects the converging walls of the brace while embracing an outer region of the brace extending inwardly from the outer edge.

22 Claims, 7 Drawing Sheets

(51) Int. Cl.
    *E04B 1/58* (2006.01)
    *E04H 12/10* (2006.01)
    *E02B 17/00* (2006.01)
    *B21D 47/00* (2006.01)
    *E04H 12/08* (2006.01)
    *F03D 13/20* (2016.01)

(52) U.S. Cl.
    CPC ........... *E04B 1/585* (2013.01); *E04H 12/085* (2013.01); *E04H 12/10* (2013.01); *F03D 13/20* (2016.05); *F05B 2240/9121* (2013.01); *Y02E 10/728* (2013.01); *Y10T 29/49627* (2015.01); *Y10T 403/34* (2015.01)

(58) Field of Classification Search
    USPC ......................................................... 52/81.3
    See application file for complete search history.

(56) References Cited

U.S. PATENT DOCUMENTS

| | | | |
|---|---|---|---|
| 3,220,152 A | | 11/1965 | Sturm |
| 4,322,176 A | * | 3/1982 | Johnson, Jr. ................. 403/219 |
| 4,835,932 A | | 6/1989 | Leete, II et al. |
| 5,044,828 A | | 9/1991 | Berner, Jr. et al. |
| 5,127,758 A | * | 7/1992 | Kreusel ........................ 403/171 |
| 6,065,267 A | | 5/2000 | Fisher |
| 2010/0005752 A1 | | 1/2010 | Hawkins et al. |

OTHER PUBLICATIONS

Danish Patent and Trademark Office, Danish Search Report and Written Opinion issued in corresponding Danish Application No. PA 2012 70388, dated May 8, 2013, 4 pages.

\* cited by examiner

NODE STRUCTURES FOR LATTICE FRAMES

FIELD OF THE INVENTION

This invention relates to node structures for lattice frames and to methods for their fabrication.

BACKGROUND

Lattice frames comprise elongate members, usually tubes, that lie on intersecting longitudinal axes and may be joined by node structures where those axes intersect. Such node structures may be cast in one piece or may be fabricated from parts by welding.

An example of a lattice frame is a 'jacket' substructure for a wind turbine or other offshore structure, which will be used to exemplify the invention in the description that follows.

Jackets have been used in the oil and gas industry for many years; they have recently also found favour in offshore wind turbine applications where water depth in excess of about twenty meters makes it impractical to use a traditional monopile or gravity-based substructure.

A jacket for an offshore wind turbine is shown in FIG. 1. The jacket 10 shown in FIG. 1 is of conventional overall shape that reflects the prior art but includes various node structures in accordance with the invention, which will be described in detail later with particular reference to FIGS. 13 to 16.

In the example shown in FIG. 1, the jacket 10 comprises four upwardly-converging tubular legs 12 that collectively define a truncated four-sided pyramid of square horizontal cross-section. A three-sided pyramid of tripod configuration is also possible, in that case having a triangular horizontal cross-section.

Each face of the pyramidal jacket 10 comprises a series of cruciform X-braces 14 of downwardly-increasing size, disposed between upper and lower horizontal struts 16 that extend between adjacent pairs of legs 12. Each X-brace 14 comprises four tubular diagonal struts 18 that converge inwardly to connect at a central X-node structure 20 and diverge outwardly toward respective K-node structures 22 that connect the diagonal struts 18 to the legs 12. Each K-node structure 22 in this example is a double-K that connects four diagonal struts 18 to the associated leg 12.

The uppermost and lowermost nodes on each leg 12 may be regarded as Y-node structures 24 as they connect only one diagonal strut 18 of each face of the jacket 10 to the associated leg 12, although each Y-node structure 24 in this example is a double-Y that connects two diagonal struts 18 of adjacent faces to the associated leg 12. However, the Y-node structures are also akin to K-node structures or double-K node structures as they also connect the horizontal struts 16 to the legs 12.

The legs 12 of the jacket 10 will seat into a pre-piled foundation structure (not shown) that is fixed to the seabed, in water whose depth is potentially in excess of thirty meters. The jacket 10 is tall enough to protrude above the surface so that a wind turbine tower may be mounted on top, clear of the water. In practice, the jacket 10 will be surmounted by a transition piece for supporting a typically tubular wind turbine tower and providing a working platform around its base, but this transition piece has been omitted from FIG. 1.

It is important for a node structure of a lattice frame to minimise stress concentrations. It is also desirable for a node structure to be compact for low material cost and to minimise resistance to water movement due to waves and tides, which imparts lateral loads to the jacket structure.

If the node structure is to be fabricated, it is desirable for that node structure to be easy to fabricate in various locations around the world with minimal tooling cost. However, whilst preferred aspects of the invention relate to fabricated node structures, other aspects relate to shape features that are independent of the means of manufacture and so may be embodied in a non-fabricated node such as a cast node.

SUMMARY OF THE INVENTION

From one aspect, the invention resides in a node structure for connecting a member of a lattice frame to one or more other members of the frame, the node structure comprising: a hollow brace having opposed walls that converge outwardly at an acute angle in cross-section toward a central plane to connect at an outer edge; and at least one root portion being a root end of a member of the frame or being for attachment to a member of the frame, which root portion has a central longitudinal axis extending outwardly in the central plane of the brace, wherein the root portion has an inner end cut away at opposite sides around the central plane to leave a joining surface that intersects the converging walls of the brace while embracing an outer region of the brace extending inwardly from the outer edge.

The root portion is suitably substantially cylindrical or prismatic, with a circular, elliptical or rectangular cross section. The brace is preferably in the form of a disc or an ellipse, or a portion of such a disc or ellipse, comprising opposed dished walls that converge outwardly in radial cross-section to connect at a convex-curved outer edge on the central plane.

The inventive concept extends to a method of fabricating a node structure for a lattice frame, the method comprising: providing a hollow brace comprising opposed walls that converge at an acute angle to connect at an outer edge; embracing the outer edge of the brace and an outer region of the brace extending inwardly from the outer edge with an inner end of at least one root portion being a root end of a member of the frame or being for attachment to a member of the frame; and joining the root portion to the brace.

In an alternative solution within the inventive concept, a node structure comprises: a hollow brace having opposed walls that converge outwardly at an acute angle in cross-section toward a central plane to connect at an outer edge; and at least one hole surface defining a hole in the outer edge and extending into the converging walls of the brace, which surface has a central axis extending outwardly in the central plane of the brace for receiving a root end of a member of the frame or a root portion for attachment to a member of the frame.

Similarly, this alternative solution may be expressed as a method of fabricating a lattice frame, the method comprising: providing a hollow brace comprising opposed walls that converge at an acute angle to connect at an outer edge and that define at least one hole surface in the outer edge and extending into the converging walls; inserting a root end of a member of the frame or a root portion for attachment to a member of the frame into a hole defined by the hole surface; and joining the member to the brace around the hole surface.

The invention also encompasses a lattice frame comprising at least one node structure of the invention or as made in accordance with the methods of the invention, a wind turbine installation comprising such a lattice frame, and a wind farm comprising one or more of such wind turbine installations.

Various optional features of the invention are set out in the appended sub-claims.

Node structures in accordance with the invention have very low stress concentration factors, for example a maximum of 2.5 whereas typical stress concentration factors are between 5 and 10. They are compact, enjoy low water resistance, are simple to fabricate and are not overly sensitive to welding tolerances. An advantageously large weld area on the jacket leg helps to reduce the thickness of the leg and hence the weight and cost of the jacket as a whole.

BRIEF DESCRIPTION OF THE DRAWINGS

In order that the invention may be more readily understood, reference will now be made, by way of example, to the accompanying drawings, in which:

FIG. 13 is an enlarged detail view of a node structure of the jacket shown in FIG. 1, namely an X-node at the centre of a cruciform X-brace of the jacket;

FIG. 14 is an enlarged detail view of another node structure of the jacket shown in FIG. 1, namely a double-K node welded to a leg of the jacket to connect diagonal struts;

FIG. 15 is an enlarged detail view of a variant of the double-K node shown in FIG. 14, in which the brace is cut away between the diagonal struts for reduced water resistance;

FIG. 16 is another enlarged detail view of a double-K node variant like that of FIG. 15;

DETAILED DESCRIPTION

Figure 1:
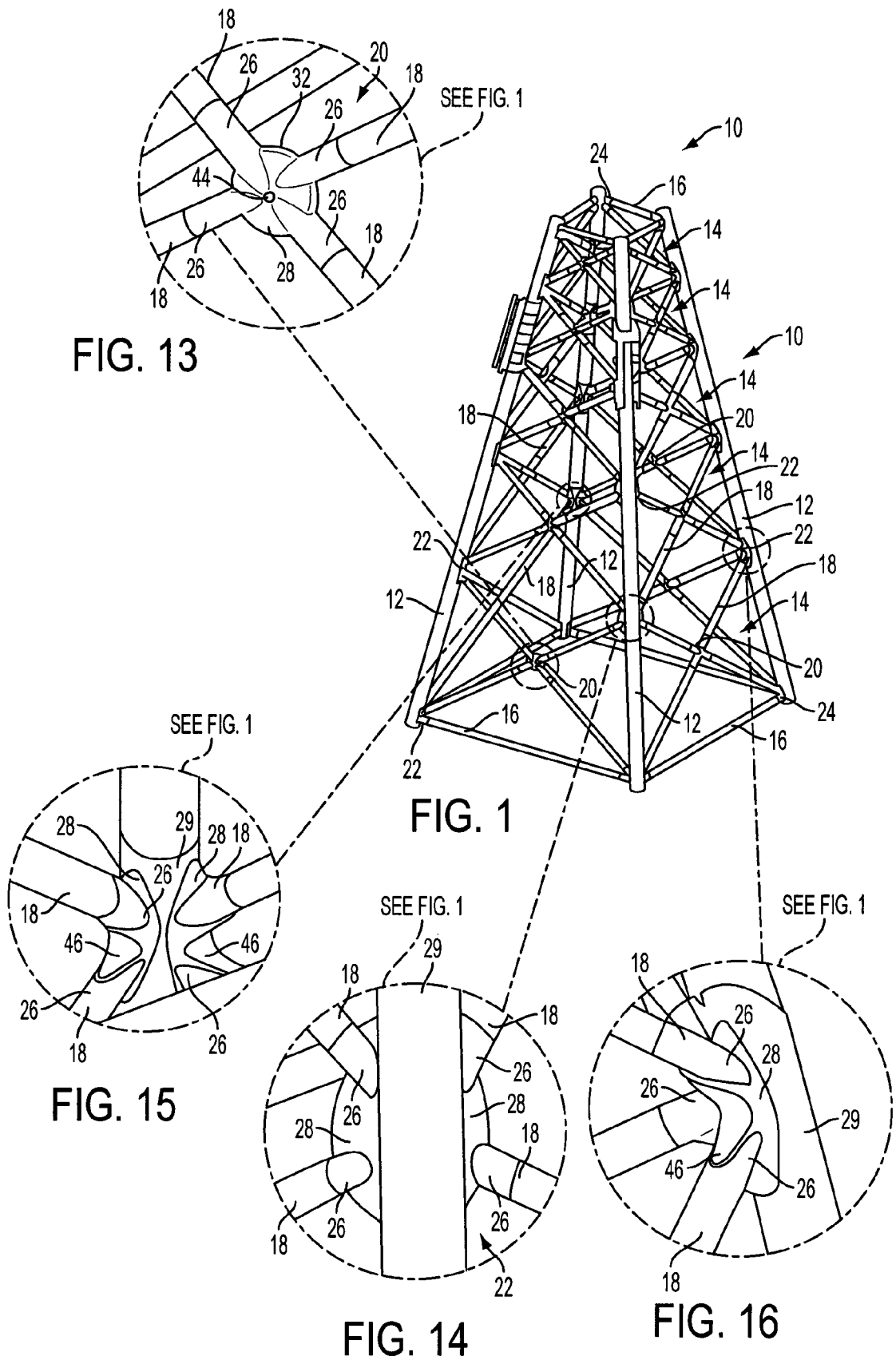
FIG. 1 is a perspective view of a lattice-type jacket substructure for an offshore wind turbine with its associated foundation structure, the jacket comprising various node structures, some of which are in accordance with the invention and are shown enlarged in FIGS. 13 to 16.
Figure 2:
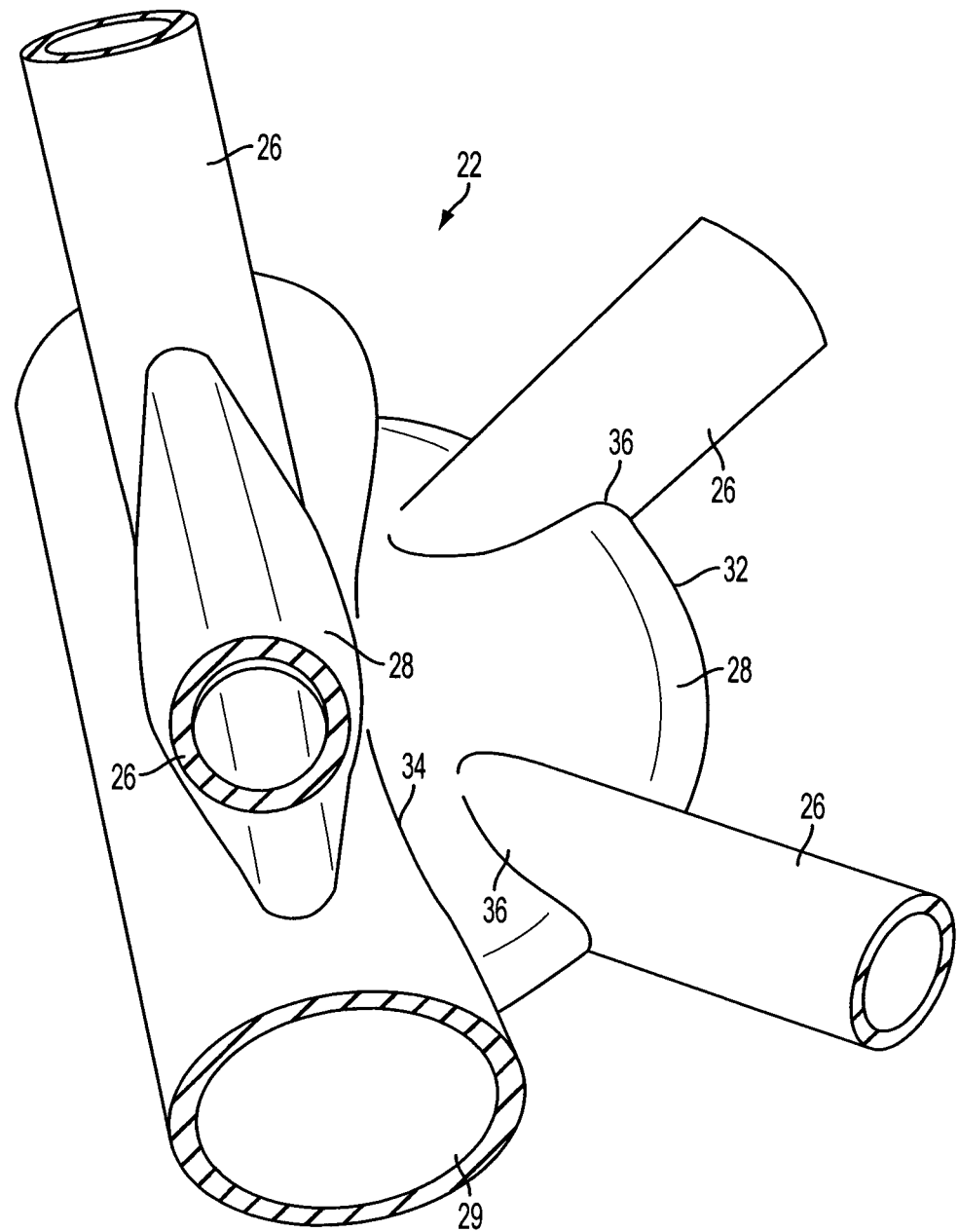
FIG. 2 is a perspective view of a double-K node structure in accordance with the invention.

Reference has already been made to FIG. 1 to put the invention into context. Referring next, then, to FIGS. 2 to 6 of the drawings, these show a double-K node structure 22 for connecting a member of a lattice-frame jacket 10 shown in FIG. 1, namely a tubular leg 12, to four other members of that jacket 10, namely tubular diagonal struts 18. The diagonal struts 18 are grouped in two pairs, those pairs being in mutually orthogonal planes about the central longitudinal axis of the leg 12.

Each pair of diagonal struts 18 converges on the double-K node structure 22, where they align with and connect to respective root portions 26 that converge on and are welded to a respective hollow brace 28. Each brace 28 is welded to a leg portion 29 that aligns with and connects to further sections of the leg 12.

Figure 5:
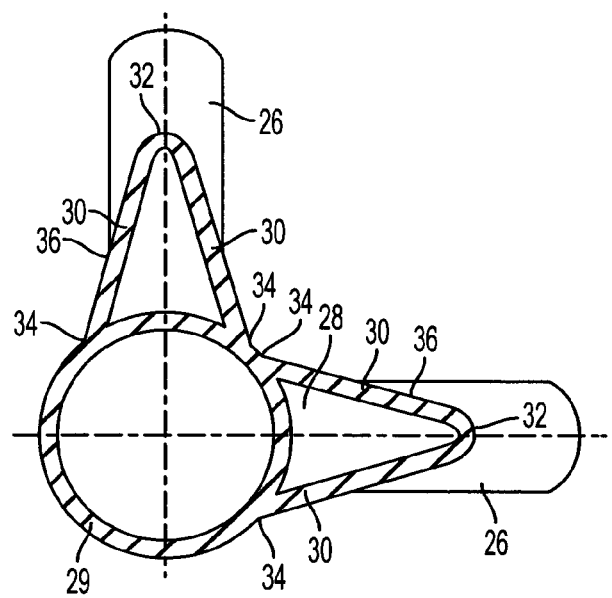
FIG. 5 is a sectional view of the double-K node structure on line V-V of FIG. 4, in a plane orthogonal to a central longitudinal axis of a leg of the jacket.
Figure 6:
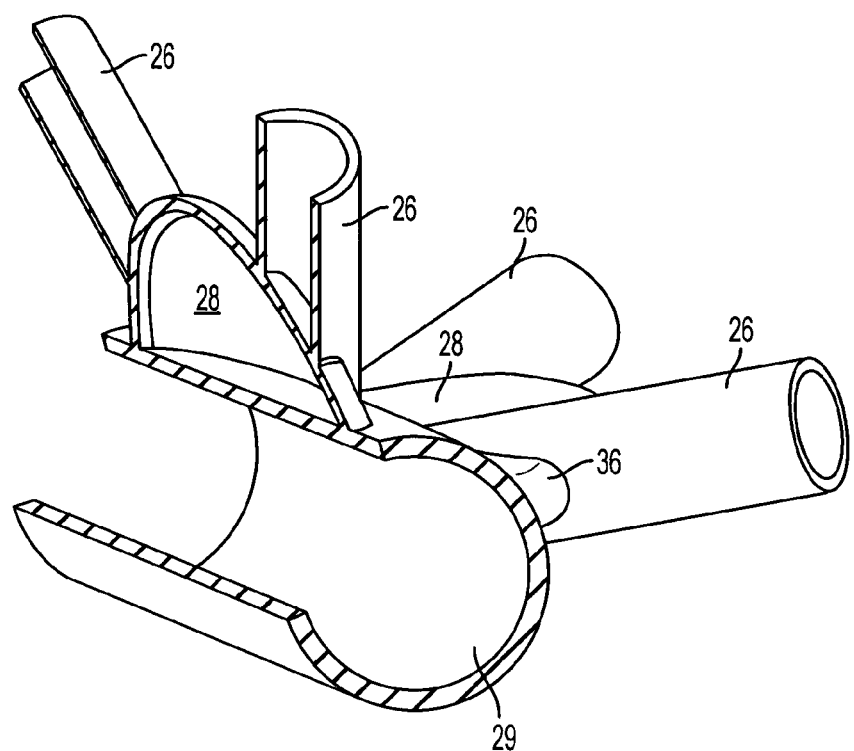
FIG. 6 is a part-sectioned perspective view of the double-K node structure of FIG. 2.

As best shown in FIG. 5, each brace 28 comprises opposed dished walls 30 that converge outwardly at an acute angle in cross-section toward a central plane to connect at a convex-curved outer edge 32. The opposed walls 30 of the brace 28 have shallow somewhat conical but generally ellipsoidal surfaces to define a lens-like shape between them.

Externally, the brace 28 is a centrally-thickened disc portion that is generally D-shaped like a segment defined between the convex-curved outer edge 32 and chord-like inner edges 34 of each dished wall 30 where the brace 28 adjoins the leg portion 29. The disc-like curvature of the brace 28 has an axis of revolution that intersects and is orthogonal to the central longitudinal axis of the leg portion 29.

The central longitudinal axis of each root portion 26 extends outwardly in the central plane of the associated brace 28. The inward thickness of the brace 28 is greater than the diameter of a root portion 26 whereas the outward thickness of the brace 28 is less than the diameter of a root portion 26. The central axis of each root portion 26 intersects the axis of curvature of the outer edge 32 of the brace 28.

An inner end of each root portion 26 is cut away at opposite sides around the central plane to leave a joining surface that intersects the converging walls 30 of the brace 28 while embracing an outer region of the brace 28 extending inwardly from the outer edge 32. Here, the root portion 26 is welded to the brace along an intersecting edge 36.

Figure 3:
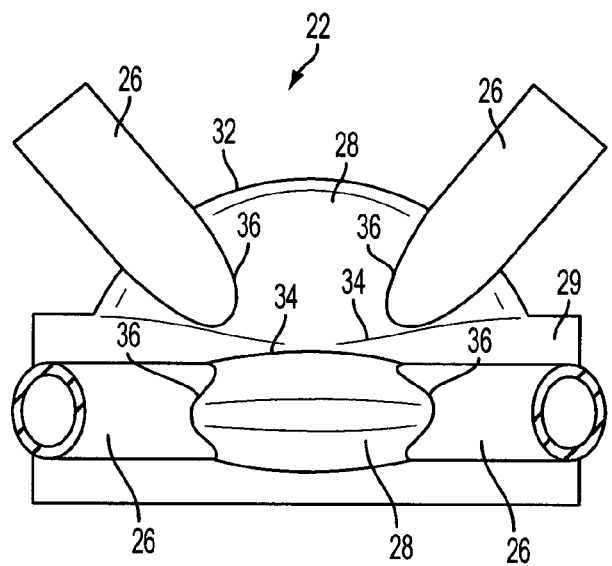
FIG. 3 is an elevation view of the double-K node structure of FIG. 2.
Figure 4:
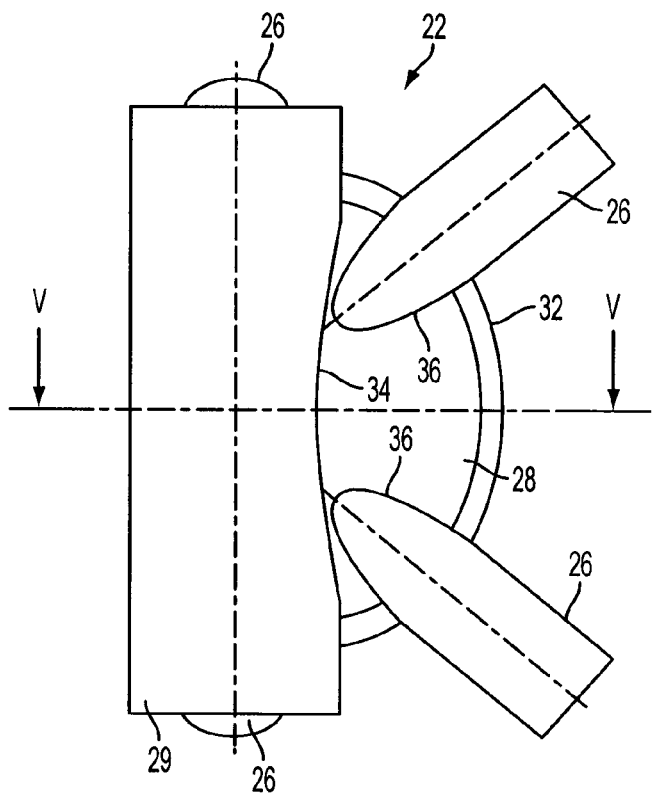
FIG. 4 is an elevation view of the double-K node structure from a side opposite to that of FIG. 3.

The intersecting edge 36 is concave-curved when viewed on an axis parallel to the central plane as shown in FIG. 5, and convex-curved when viewed on an axis orthogonal to the central plane as shown in FIGS. 3 and 4.

Turning now to FIGS. 7 to 12 of the drawings, these show a manufacturing sequence for producing and assembling a simplified node structure of the invention that joins one strut 18 to a leg 12 via a root portion 26 and a leg portion 29.

Figure 7:
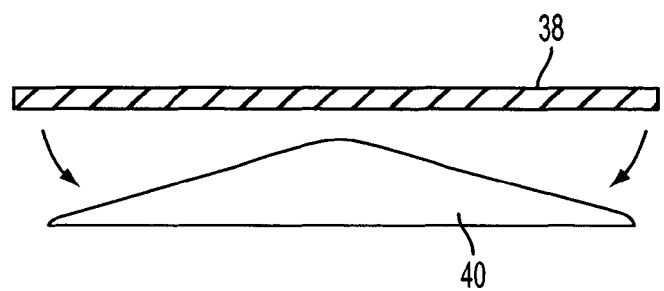
FIG. 7 is a sectional side view of a flat plate or sheet of steel being formed on a convex former, die or mandrel to produce a brace wall.
Figure 8:
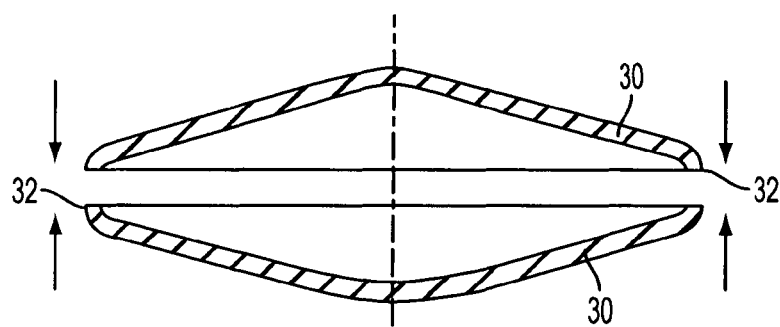
FIG. 8 is a sectional side view showing opposed brace walls being brought together for circumferential welding to produce a hollow brace body.
Figure 9:
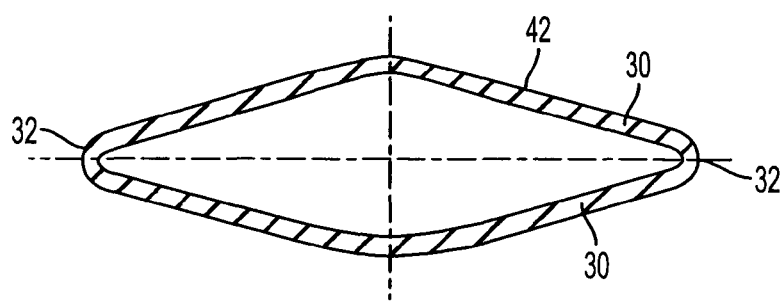
FIG. 9 is a sectional side view of the brace body produced by the step shown in FIG. 8.
Figure 10:
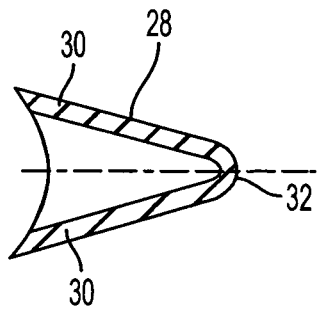
FIG. 10 is a sectional side view of a portion of the brace body cut away to produce a brace.

FIG. 7 shows the optional preliminary step of forging a disc 38 of sheet or plate metal about a shallow conical former, die or mandrel 40 with a rounded apex to form one of the opposed walls 30 of the brace 28. Two such walls 30 are shown being brought together in opposition in FIG. 8, whereupon they are welded together around their abutting outer edges 32 to form a hollow body 42 as shown in FIG. 9. That hollow body 42 is then cut to form a brace 28 as shown in FIG. 10; more than one such brace 28 may be cut from the same hollow body 42.

Figure 11:
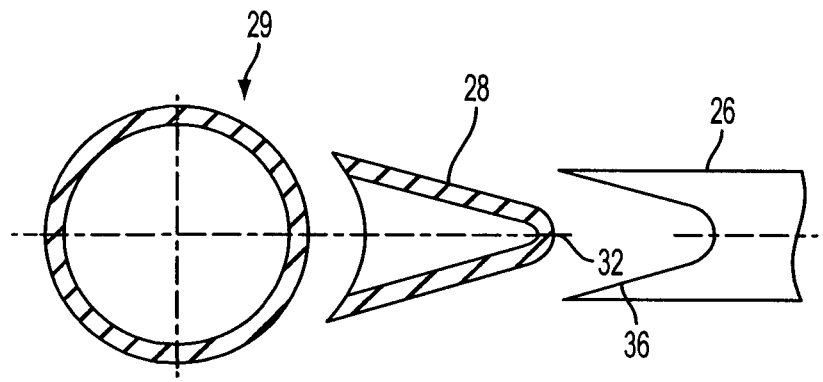
FIG. 11 is an exploded sectional side view of the brace disposed between a leg of the jacket and a strut of the jacket, the strut having an end shaped to fit the outer surface of the brace.
Figure 12:
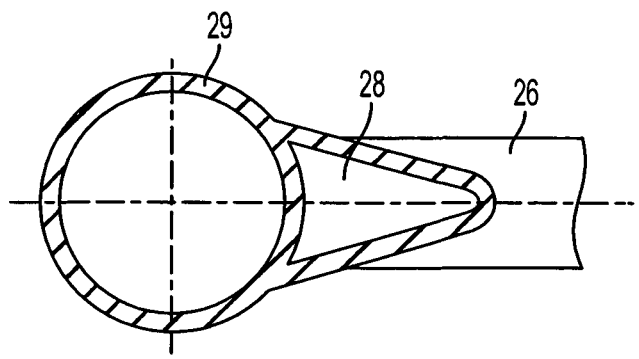
FIG. 12 is a sectional side view of the brace, the leg and the strut of FIG. 11, assembled and welded together.

FIGS. 11 and 12 show the brace 28 interposed between the leg portion 29 and the root portion 26, both of which are cut from steel tube. FIG. 11 shows how an end of the root portion 26 is cut away to define the intersecting edge 36, to match the curvature of the brace 28 where it will embrace the outer region of the brace 28 extending inwardly from the outer edge 32. When assembled as shown in FIG. 12, welds join the brace 28 to the leg portion 29 and join the root portion 26 to the brace 28.

Moving on to FIGS. 13 to 16, which are set out beside FIG. 1, these are enlarged detail views showing various node structures of the invention incorporated into the jacket 10 shown in FIG. 1.

Specifically, FIG. 13 shows an X-node structure 20 that connects four diagonal struts 18 of an X-brace 14 in a cruciform arrangement, without connecting those struts 18 to a leg 12 of the jacket 10. The X-node structure 20 has a brace 28 in the form of a continuous circular disc that supports four root portions 26.

The opposed walls 30 of the brace 28 are connected by an internal bulkhead spaced from the outer edge 32, the bulkhead in this example being a tube 44 extending between the opposed walls on an axis orthogonal to the intersecting central axes of the struts 18 and root portions 26. The opposed walls 30 of the brace 28 are penetrated by a hole aligned with the tube 44.

FIG. 14 shows a double-K node structure 22 like that shown in FIGS. 2 to 6, whereas FIGS. 15 and 16 show variants of that double-K node structure in which concave-curved cut-outs interrupt the convex-curved outer edge of the brace 28 between adjacent root portions 26. Specifically, each cut-out is defined by an outwardly-facing concave wall 46 extending between the opposed walls 30 of the brace 28. The cut-outs reduce weight and hence material cost; they also beneficially reduce the resistance of the jacket 10 to water flow.

Figure 17:
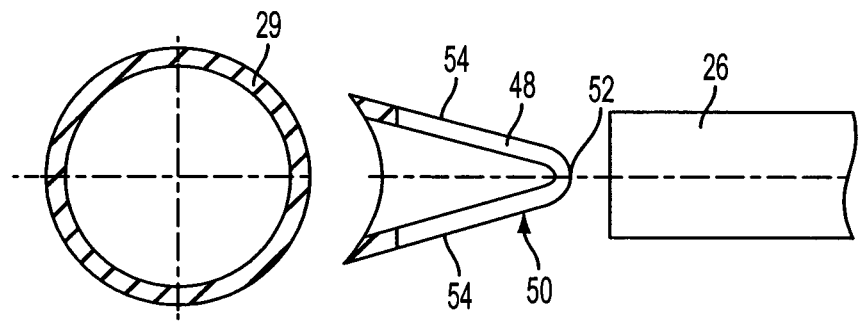
FIG. 17 is an exploded sectional side view corresponding to FIG. 11 but showing a variant of the brace disposed between a leg of the jacket and a strut of the jacket, the strut in this variant having a flat end and being inserted through a hole in the brace.
Figure 18:
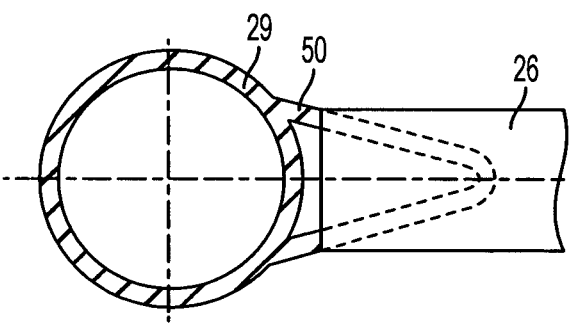
FIG. 18 is a sectional side view of the brace, the leg and the strut of FIG. 17, assembled and welded together.

Finally, FIGS. 17 and 18 show a variant of the invention in which a root portion 26 is a pipe with a flat end that is inserted through a hole 48 in a brace 50. The hole 50 is in the outer edge 52 of the brace 50 and extends into the converging walls 54 of the brace 50 to receive a root end of the root portion 26.

The edge of the hole 48 in FIGS. 17 and 18 is shaped like the intersecting edge 36 of the root portion 26 shown in FIGS. 3, 4 and 5 but in reverse: the edge of the hole 48 is convex-curved when viewed on an axis parallel to the central plane as shown in FIG. 17, but is concave-curved when viewed on an axis orthogonal to the central plane.

Once inserted into the hole 48 as shown in FIG. 18, the a root portion 26 is welded to the brace 50 around the edge of the hole 48.

Other variations are possible within the inventive concept. For example, the leg portion and the root portions may instead be integral with the legs and struts. In other words, a leg and struts may be welded directly to the brace, such that, in effect, root ends of the struts become part of the node structure. The invention therefore encompasses a node structure when part of a lattice frame or otherwise. It is also possible for a node structure of the invention to omit the leg or leg portion and instead to define a cylindrical seat recess between the inner edges of the dished walls of the brace, shaped to attach the node structure to a leg by welding.

The invention claimed is:

1. A node structure for connecting a member of a lattice frame to one or more other members of the frame, the node structure comprising:

a hollow brace having opposed walls that converge outwardly at an acute angle in cross-section toward a central plane to connect at an outer edge, the outer edge defining a solid curved surface at an outer periphery of the brace, the solid curved surface defining a portion of an outer surface of the brace; and at least one root portion being a root end of a member of the frame or being for attachment to a member of the frame, which root portion has a central longitudinal axis extending outwardly in the central plane of the brace, wherein the root portion has an inner end cut away at opposite sides around the central plane to leave a joining surface that engages the outer surface and the solid curved surface of the brace without penetrating through the brace so as to extend into contact with both of the opposed walls on opposite sides of the outer edge and thereby embrace an outer region of the brace extending inwardly from the outer edge, wherein the root portion is joined to the brace at the engagement between the joining surface and the outer surface.

2. The node structure of claim 1, wherein an intersecting edge of the joining surface is concave-curved when viewed on an axis parallel to the central plane where opposite sides of the root portion are cut away, and convex-curved when viewed on an axis orthogonal to the central plane.

3. The node structure of claim 1, wherein the brace supports first and second root portions with respective outwardly-extending central longitudinal axes diverging outwardly in the central plane of the brace for alignment with respective members of the frame.

4. The node structure of claim 1, wherein an inward thickness of the brace is greater than a diameter of the root portion and an outward thickness of the brace is less than the diameter of the root portion.

5. The node structure of claim 1 and having a cut-out interrupting the outer edge of the brace, defined by an outwardly-facing concave wall extending between the opposed walls of the brace.

6. The node structure of claim 1, wherein the opposed walls of the brace are also connected by at least one internal bulkhead spaced from the outer edge.

7. The node structure of claim 6, wherein the bulkhead comprises a tube extending between the opposed walls on an axis substantially orthogonal to the central axis of the, or each, root portion.

8. The node structure of claim 1, wherein the opposed walls of the brace have ellipsoid or conical surfaces.

9. The node structure of claim 1, wherein the brace is in the form of a disc or an ellipse, or a portion of such a disc or ellipse, comprising opposed dished walls that converge outwardly in radial cross-section to connect at the outer edge, which is convex-curved.

10. The node structure of claim 9, wherein the central axis of the, or each, root portion intersects an axis of curvature of the outer edge of the brace.

11. The node structure of claim 9, wherein the brace is in the form of a disc portion defined between the convex curvature of the outer edge and chord-like inner edges of each dished wall extending between opposite ends of the outer edge.

12. The node structure of claim 11, wherein the inner edges of the dished walls together define a seat recess shaped for joining the node structure to an elongate member that has a central longitudinal axis lying on the central plane of the brace.

13. The node structure of claim 12, wherein the node structure further comprises an elongate cylindrical member for end-on alignment with, and joining to, one or more other members of the lattice frame, the cylindrical member being located in a seat recess of matching shape and having a central longitudinal axis that lies on the central plane of the brace.

14. The node structure of claim 13, comprising first and second braces angularly spaced about the cylindrical member.

15. The node structure of claim 12, wherein the segment-shaped disc portion of the brace has an axis of revolution intersecting and orthogonal to the central longitudinal axis of the member for which the seat recess is shaped.

16. The node structure of claim 1, wherein the node structure is fabricated from metal parts, wherein the opposed walls are formed from sheet or plate metal and any root portion is cut from a metal tube.

17. A method of fabricating a node structure for a lattice frame, the method comprising:
providing a hollow brace comprising opposed walls that converge at an acute angle in cross-section toward a central plane to connect at an outer edge, with the outer edge defining a solid curved surface at an outer periphery of the brace, the solid curved surface defining a portion of an outer surface of the brace;
engaging the outer surface and the solid curved surface of the brace with a joining surface defined by an inner end of at least one root portion being a root end of a member of the frame or being for attachment to a member of the frame, wherein the root portion does not penetrate through the brace and thereby extends into contact with both of the opposed walls on opposite sides of the outer edge so as to embrace an outer region of the brace extending inwardly from the outer edge; and
joining the root portion to the brace at the engagement between the joining surface and the outer surface.

18. A method of fabricating a lattice frame, the method comprising:
providing a unitary hollow brace comprising opposed walls that converge at an acute angle in cross-section toward a central plane to connect at an outer edge;
forming at least one hole through the unitary hollow brace such that the at least one hole defines a closed-loop hole edge that is located at the outer edge and also extends into the opposed walls of the unitary brace;
inserting a root portion, which is a root end of a member of the frame or for attachment to a member of the frame, into the at least one hole such that the root portion penetrates through the brace; and
joining the root portion to the brace around the hole edge.

19. The method of claim 17, comprising joining a pair of opposed walls to form the brace.

20. The method of claim 19, comprising forging sheet or plate metal to form the opposed walls.

21. A lattice frame comprising at least one node structure as defined in claim 1.

22. A wind turbine installation comprising the lattice frame of claim 21.

* * * * *